United States Patent [19]

Kang

[11] Patent Number: 5,165,462
[45] Date of Patent: Nov. 24, 1992

[54] ANTI-GLARE WINDOW SCREEN

[76] Inventor: Shih-Jin Kang, 15400 Bitterroot Way, Rockville, Md. 20853

[21] Appl. No.: 563,809

[22] Filed: Aug. 6, 1990

Related U.S. Application Data

[63] Continuation of Ser. No. 365,813, Jun. 14, 1989, abandoned.

[51] Int. Cl.$^5$ .................................................. B60J 3/06
[52] U.S. Cl. .................................. 160/370.2; 296/97.7
[58] Field of Search ............. 160/370.2, 84.1, DIG. 2, 160/DIG. 3; 296/97.7, 95.1; 248/309.3, 684, 363, 205.5, 206.2, 206.3, 206.4, 683; 4/581, 582, 583

[56] References Cited

U.S. PATENT DOCUMENTS

| | | | |
|---|---|---|---|
| 2,466,502 | 4/1949 | Stiller | 248/206.4 X |
| 2,471,008 | 5/1949 | Pretty | 4/583 |
| 2,785,001 | 3/1957 | Soucy | 248/205.5 X |
| 3,048,439 | 8/1962 | Brigmon | 296/95.1 |
| 3,091,779 | 6/1963 | Lucas et al. | 248/363 X |
| 3,101,566 | 8/1963 | Stiller | 248/205.5 X |
| 3,338,293 | 8/1967 | Hohmann | 248/205.5 X |
| 4,109,957 | 8/1978 | Polizzi et al. | 296/95.1 |
| 4,235,041 | 11/1980 | Sweet | 248/206.4 X |
| 4,607,875 | 8/1986 | McGirr | 296/97.7 |
| 4,838,335 | 6/1989 | Eskandry et al. | 160/370.2 X |
| 4,842,322 | 6/1989 | Iu | 248/363 X |
| 4,848,542 | 7/1989 | Burnette et al. | 248/206.4 X |
| 4,943,103 | 7/1990 | Rosen | 296/97.7 X |

FOREIGN PATENT DOCUMENTS

| | | | |
|---|---|---|---|
| 888873 | 2/1962 | United Kingdom | 296/95.1 |
| 1066822 | 4/1967 | United Kingdom | 296/95.1 |

Primary Examiner—David M. Purol
Attorney, Agent, or Firm—Michael J. McGreal

[57] ABSTRACT

The glare of a window can be reduced by attaching to the window an anti-glare shield which is comprised of a base sheet material having on each side thereof a plurality of suction attachment devices such as suction cups. By having suction cups on each side the sheet material can be changed from a right side window to a left side window. In addition it can be cut to fit a large number of window sizes.

11 Claims, 1 Drawing Sheet

ANTI-GLARE WINDOW SCREEN

This is a continuation of co-pending application application Ser. No. 07/365,813 filed on Jun. 14, 1989 now abandoned.

This invention relates to an anti-glare window screen that is attached to a window by means of a plurality of suction attachment means. More particularly this invention relates to an anti-glare window screen which can be cut to a desired shape and can then be interchangeably affixed to either the right or left side windows of a vehicle.

There is a problem in many vehicles that the sun in the mornings and evenings will enter a vehicle and produce an annoying glare. The front windshield has adjustable visors to prevent much of the glare from impeding the driver or significantly annoying a front seat passenger. However, the driver, a front seat passenger and others in a car are not so protected from the sun that enters through side windows. The glare produced by this sun will be annoying and in some instances can temporarily impair the vision of the driver and others in a car. In addition this is a particularly serious problem with regard to children and infants. Children and infants due to their low profile in a vehicle will be contacted in the facial area by sun for longer periods of time during a day. The resulting glare makes car travel unenjoyable for the children and infants, and tedious for the parents. The present invention is directed to a method for correcting this problem. This consists of using anti-glare screens cut to the shape of a window and which are attached to the surface of a window by means of a plurality of suction means. Further, these anti-glare screens have suction cup means on both sides of the anti-glare sheet so that the anti-glare screen, once cut to shape, can be used on either the right or left side windows of a vehicle.

Anti-glare screens have been developed and used in the past. These have been attached electrostatically, by suction cups, and adhesives. However, none of these anti-glare screens have had suction means on both sides of the anti-glare screen whereby the anti-glare screen can be quickly changed from one window to another in a vehicle.

U.S. Pat. Nos. Re. 17,735, 2,706,6559, 4,607,875, 4,736,980, and 4,758,042 disclose various types of sun visors and shields to be used on automobile or aircraft windows in order to decrease the amount of sunlight that would be permitted to enter the automobile or aircraft. Each of these devices is mounted onto the window glass by means of suction cups. In general, in these references, the glare shield is not directly supported by the suction cups, but rather a framing or other means is supported by the suction cups. The framing or other means then carries the anti-glare shield. These patents show that it is known to utilize suction cups for mounting anti-glare shields to the windows of automobiles, but not to use suction means on each side of an anti-glare shield.

U.S. Pat. No. 4,749,222 discloses a sun shade for automobiles which consists of a sheet of vinyl plastic material which is electrostatically adhered to the window surface. This electrostatically adhered plastic material functions to selectively prevent sunshine from entering an automobile. Since the sheet of vinyl plastic material is electrostatically adhered to the surface of the window, it can be removed from one window surface and applied to another window surface. Further, it is disclosed that the vinyl plastic material can have different properties. That is, the transparency of the vinyl plastic material can be varied. This patent shows the use of vinyl plastic materials as anti-glare shields on automobile windows and that these can be removed from one window and placed onto another window. However, in this patent, it is disclosed that the vinyl plastic material electrostatically adheres to the glass rather being attached to the glass by means of a plurality of suction means.

U.S. Pat. No. 4,172,613 discloses a glare shield for automobiles which consists of a plastic sheet material which can be adhered to a window. Further, this plastic sheet material has breakaway end portions so that these can be stripped away in the fitting of the plastic material onto the automobile window. The plastic material is adhered to the window surface by means of suction cups or strips of adhesive. There is also disclosed a cutaway center area so that the anti-glare shield can be disposed around a rear view mirror. This patent shows the use of a plastic anti-glare shield material that can be adhered to a windshield by means of suction cups. However, this patent does not show the use of suction cups on both sides of the anti-glare material so that it can be used on different windows in an automobile.

U.S. Pat. No. 4,759,581 discloses a privacy and sunshade for a windshield which is fastened to a windshield by means of a touch fastener material such as Velcro. This patent shows the use of touch fastening materials in attaching anti-glare shields and that the use of such materials is known in the art.

U.S. Pat. No. 4,784,426 discloses an infant protector shade for use in an automobile. This protective shade is not applied to any of the window surfaces of the automobile. Rather, it is disposed over the infant. However, it does use suction cups for the attachment at one end to the automobile windshield.

German Patent DE 2950-878 discloses anti-dazzle shields for an automobile. These shields are directed to protect the driver from the glare from the exterior mirror and from low sun. The shields are noted to be fitted to the glass of the automobile using simple suction. Further it is disclosed that these anti-dazzle shields can be moved on the windshield and other windows to suit the driver. Although this reference does disclose the use of moveable glare shields on the windows of an automobile, it does not disclose the use of anti-glare shields which have suction attaching means on both sides of the shields.

BRIEF SUMMARY OF THE INVENTION

This invention is directed to an anti-glare shield that is attached to a glass surface by means of suction. The anti-glare shield has a plurality of suction cup means on each side of the anti-glare shield. These suction cup means can be in a planar alignment on each side or in a juxtaposed alignment. Further the base anti-glare material can be of a varying transmissivity over part or all of its surface.

In use the anti-glare shield is measured to fit a particular vehicle window. This will be either a right or left side window. Once cut to size the anti-glare shield is attached to a window by pressing it against the window surface. It can be removed form the window by being pulled from the window surface. It can then be applied to a window surface on the other side of a vehicle by being pressed against this window. Attachment is by means of the plurality of suction means on the other side of the anti-glare shield.

These anti-glare shields can be opaque, partially transparent, of varying transparency or may be light polarizing. Regardless of the type they will have suction attachment means on each side. The base material will be of a plastic such as polyvinyl acetate, polyvinyl chloride, polyethylene, polypropylene, polyesters and of essentially any other flexible plastic material.

DETAILED DESCRIPTION OF THE INVENTION

As has been noted above, the present anti-glare window screen consists of a base sheet material which has on both sides of the sheet material a plurality of suction means. These suction means are preferably a plurality of suction cups. There are suction means on each side of the base material so that the base material can be attached to a window glass by means of either side of the anti-glare material. Further, this base sheet material is of a thickness so that it can be readily cut utilizing a conventional type of scissors, but yet thick enough to permit multiple usage. In this way, the anti-glare shield can be custom fitted to any side window of a vehicle, and further it can be interchanged from one side window to another side window of the vehicle. This is the case since it will have suction attaching means on each side. In this way a single anti-glare shield can be utilized for both morning and evening travel when the sun is low in the sky. In such a case when a person is driving to work, the anti-glare shield can be used on the window on the eastward side of the vehicle. In the evening this anti-glare shield can be switched to the westward side of the vehicle so as to reduce the glare at that time of the day. All that is necessary is that the anti-glare shield be pulled from the eastward window and pressed against the westward window. By being gently pressed against the window, the suction cup means attach the base anti-glare shield material to the window.

Figure 1:
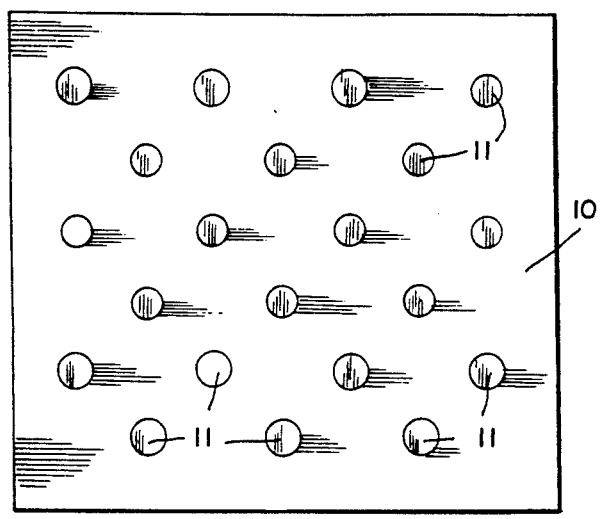
FIG. 1 is a planar view of a sheet of the present anti-glare shield.

In FIG. 1 there is shown a sheet of the present anti-glare material. The base material is designated as 10 and the plurality of suction attaching means are designated 11. The base material can be comprised of polyvinyl acetate, polyvinyl chloride, polyethylene, polypropylene, polyesters and the like. Essentially, any flexible polymeric material can be utilized. This base material can be opaque to almost fully transparent. It can also be of varying degrees of transparency. In addition the base material can be light polarizing.

In structure the base material is from about 0.001 inch thick to about 0.15 inch thick. Preferably it is about 0.05 to about 0.1 inch thick. The suction cups can be of essentially any size. The larger the suction cups, the fewer need to be used. Typically the suction cups will be about 0.05 inch to about 0.5 inch in diameter, and preferably about 0.1 inch to 0.25 inch in diameter. The number of suction cups per square foot will be from about 5 to 50 and preferably from about 10 to 35.

The suction cups are preferably an integral part of the base material. That is, they are a single molded piece. However, the suction cups can be attached to the base material by means of adhesives or by mechanical means.

Figure 2:
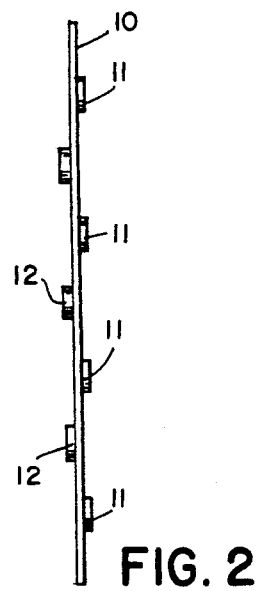
FIG. 2 is a side elevational view of the anti-glare shield of FIG. 1 wherein the suction attaching means one juxtaposed arrangement on each side of the shield.
Figure 3:
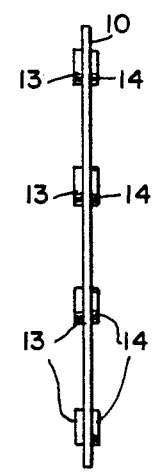
FIG. 3 is a side elevational view of the anti-glare shield of FIG. 1 wherein the suction attaching means are in a planar alignment on each side of the shield.

In FIG. 2 there is shown a side elevational view of a sheet of anti-glare material. In this view it is shown that the suction cup means are juxtaposed on each side of the anti-glare material. That is, the suction cups 11 are not in a planar alignment in a transverse direction with the suction cups of 12. However, in FIG. 3 suction cup means 13 and 14 are shown to be in a planar alignment. That is, in FIG. 4 the base material is shown to carry suction means 13 and 14 wherein these suction means are in a common transverse plane.

Figure 4:
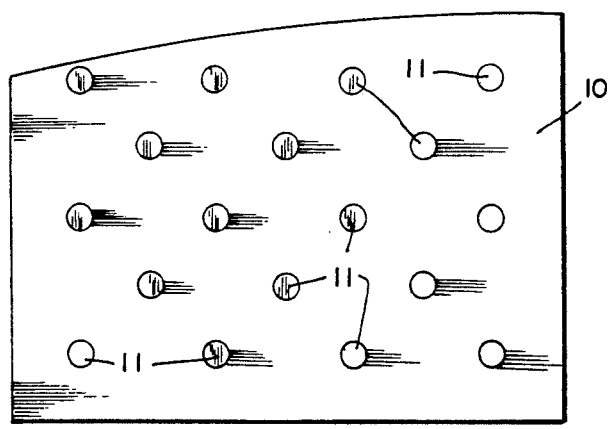
FIG. 4 is a sheet of anti-glare material cut to fit a vehicle window.
Figure 6:
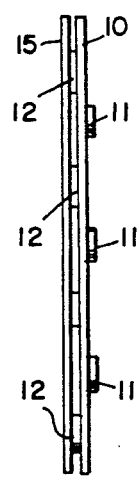
FIG. 6 is a side elevational view of the anti-glare shield material attached to a window as shown in FIG. 5.
Figure 5:
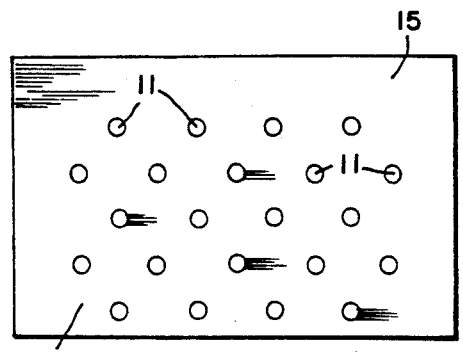
FIG. 5 is a sheet of the anti-glare shield material attached to a window.

In FIG. 4 there is shown the present anti-glare material cut to the shape of a particular automobile window. Here it is shown that the anti-glare material 10 carries a plurality of suction cup means 11. This anti-glare shield material is shown in FIG. 5 to be attached to a window 15. This is applied to window 15 by means of light pressure onto the side of the anti-glare shield material 10 which is not in contact with window 15. Such light contact causes the suction cups to grab onto the window and to attach the anti-glare shield base material to the window. This anti-glare shield material can be removed from the window by holding one edge of the anti-glare sheet material and pulling so as to break the suction on the various suction cups. In FIG. 6 there is shown a side elevational view of the anti-glare sheet material attached to a window as shown in FIG. 5.

As has been noted this anti-glare shield material can be utilized on essentially any type of vehicle and can also be utilized in the home. At times in the home it is desired to attenuate the amount of light that enters a window so that draperies, furniture or carpeting does not become bleached out by the sun. In this regard the anti-glare sheet material can be cut to the proper size and applied to household windows. If desired, this shield material can be moved from one side of the house to the other during a day as the sun travels from east to west. Further, this anti-glare shield material is easily removable when it is desired to clean the window or to do other maintenance on a window. As noted above, it can merely be peeled from the window.

Figure 7:
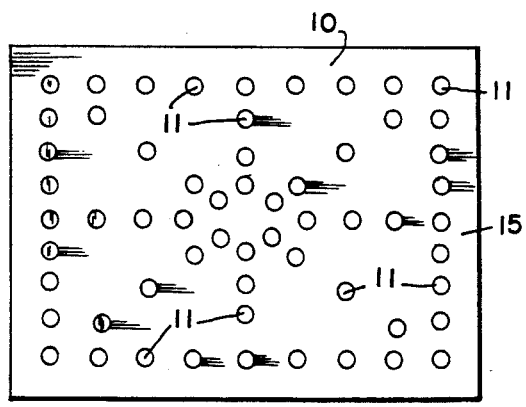
FIG. 7 is a planar view of the anti-glare shield with a design thereon.

This anti-glare shield material is very effective in automobiles where young children or infants are passengers. This is the case since due to their low position in the vehicle, they are very susceptible to the glare of incoming sunlight. It is therefore advantageous to have a piece of anti-glare material cut to the size of the auto windows and to apply this to the auto windows. This anti-glare shield can be moved from the eastwardly directed windows to the westwardly directed windows as desired. In addition to preventing glare, these anti-glare shields will also prevent a certain amount of heat radiation from entering the vehicle. That is, some of this heat radiation will be reflected back out through the window. It is also advantageous when the anti-glare shield is to be used with regard to children tha it contain a design. The design can be solely in the base material, but it is preferred that the suction cups comprise the design as shown in FIG. 7.

The present anti-glare window screen materials also have many other advantages. These are far too numerous to be enumerated. However, suffice it to say that if one practices the present invention by utilizing an antiglare window screen wherein there are suction cups on each side of the base material window screen he will gain all of the inherent advantages of the present invention.

What I claim is:

1. An anti-glare vehicle window comprising a vehicle window which has attached thereto by means of suction a base sheet material which is at least partially transparent and having on each side thereof a plurality of suction attachment means whereby the base sheet material can be cut to be attached to a first vehicle window by suction cups on one side and to another vehicle window of a similar shape by the suction cups on the other side.

2. An anti-glare vehicle window as in claim 1 wherein said plurality of suction attachment means on each side of said base sheet material are located in a transverse planar alignment.

3. An anti-glare vehicle window as in claim 1 wherein said plurality of suction attachment means on each side of said base sheet material are located in a juxtaposed alignment to each other.

4. An anti-glare vehicle window as in claim 1 wherein the base sheet material is transparent.

5. An anti-glare vehicle window as in claim 4 wherein said plurality of suction attachment means on each side of said base sheet material are located in a transverse planar alignment.

6. An anti-glare vehicle window as in claim 4 wherein said plurality of suction attachment means on each side of said base sheet are located in a juxtaposed alignment to each other.

7. An anti-glare vehicle window as in claim 1 wherein said base material is a sheet of plastic.

8. An anti-glare vehicle window as in claim 1 wherein said plurality of suction attachment means are an integral part of the base sheet material.

9. An anti-glare vehicle window as in claim 1 wherein said plurality of suction attachment means are each attached to the base sheet material.

10. An anti-glare vehicle window as in claim 1 wherein said base sheet material has a design thereon.

11. An anti-glare vehicle window as in claim 10 wherein said design is comprised of said suction attachment means.

* * * * *